United States Patent Office 3,163,922
Patented Jan. 5, 1965

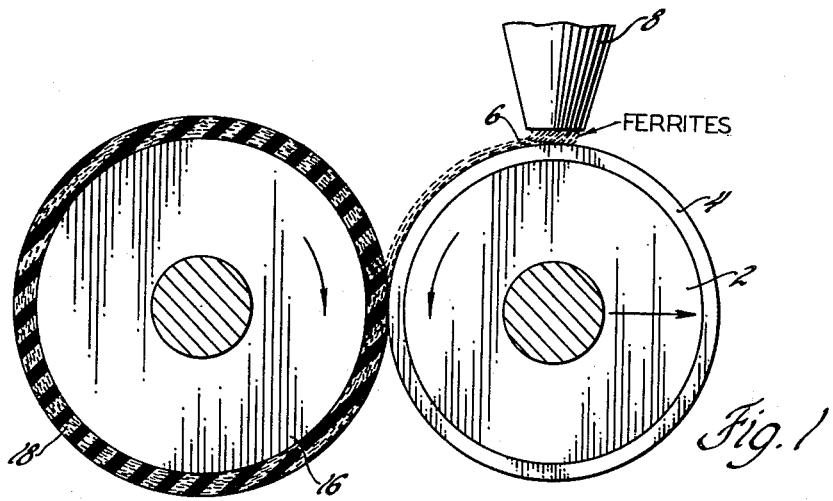
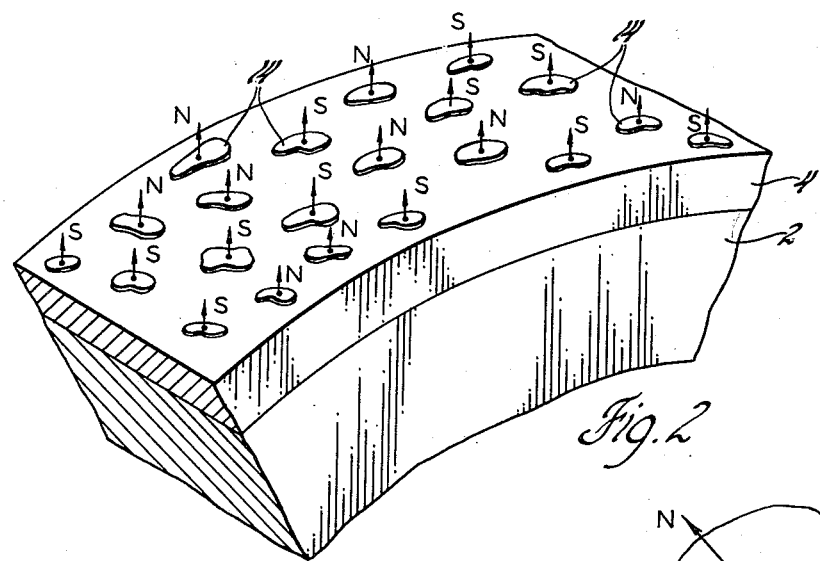
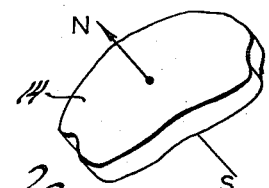
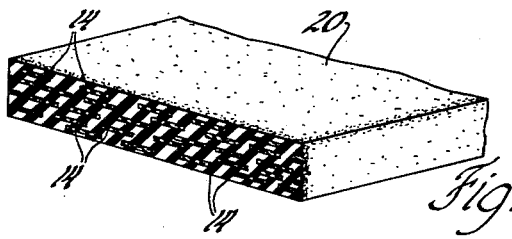

3,163,922
PROCESS FOR ORIENTING FERRITES
Vladimir Brailowsky, Birmingham, Mich., assignor to General Motors Corporation, Detroit, Mich., a corporation of Delaware
Filed Dec. 8, 1960, Ser. No. 74,511
3 Claims. (Cl. 29—155.6)

This invention relates to a method of fabricating oriented ferrite bodies and is an improvement over the method of fabricating such bodies disclosed in my earlier application Serial No. 17,540, filed March 25, 1960, now Patent 3,110,675, entitled "Method of Fabricating Ferrite Bodies."

Ceramic magnets made of oriented magnetically hard ferrite bodies which are used as permanent magnets are currently expensive components. The expense is due partly to the fact that it has been necessary to use costly dies to form desired shapes which because of the abrasive characteristics of the material had a limited life and required early replacement. The expense is also increased by the requirement that the pressing must be carried out in the presence of a magnetic field. Further and because of the restrictions on die shape imposed by the need for a magnetic field, by the total reduction in volume required to remove the liquid, and by the requirement of a relatively uniform density, ferrite bodies made by this process can only have very simple shapes.

It is an object in making this invention to provide an inexpensive method of fabricating oriented ferrite bodies.

It is a further object in making this invention to provide a method of fabricating magnetically hard oriented ferrite bodies that does not require expensive dies and that provides uniform material density and strength of the resultant part.

With these and other objects in view which will become apparent as the specification proceeds, my invention will be best understood by reference to the following specification and claims and the illustrations in the accompanying drawings, in which:

FIGURE 1 is a diagrammatic showing of how the ferrite materials are mixed with temporary supporting or bonding means, such as rubber compounds through use of rubber rolling mills until the proper density and mixing has been obtained.

FIG. 2 is a perspective view of a portion of one of the drum surfaces of the rolling mill showing the ferrite crystals, greatly enlarged, as they are deposited on the surface prior to rolling into the bonding material.

FIG. 2a is an enlarged perspective view of a single ferrite crystal illustrating its magnetic axis.

FIG. 3 is an enlarged perspective sectional view through a section of material including bonding and ferrite crystals before firing showing the alignment and orientation of the crystals.

In order to produce oriented ferrite bodies for use as permanent magnets by previously known methods, the basic raw materials in bulk are first taken, thoroughly mixed in a ball mill with some liquid to form a slurry and then filtered and dried. This material is then pelletized and fired to produce polycrystalline ferrite material. This material is ground until it is in the form of a powder of single crystals of the proper size which might be, for present use, of the order of 1 micron, as shown in FIG. 2a. It is then ready for use.

A slurry is prepared from the powder and then pressed into desired shapes in expensive, non-magnetic dies in the presence of a strong magnetic field which simultaneously orients the crystals in proper alignment. After the material has been formed into the desired shape under the orienting magnetic field it is then removed from the die at which time it has minimum mechanical strength and may be broken. It is then dried and finally sintered. At the conclusion, it is lastly magnetized in its final mechanical shape.

In my earlier filed application Serial No. 17,540, previously mentioned, a method of fabricating magnetically hard oriented ferrite bodies was disclosed which eliminated the necessity of using an orienting magnetic field at the time the material was being formed into its desired shape and which also produced uniform density throughout. In that method the ferrite crystals were mixed with a bonding material, such as raw rubber, in a rubber mill and then through mechanically rolling the same into flat sheets by using calendaring rolls, orienting the crystals in the material without the use of any magnetic field. This method did not require the use of expensive dies and the sheet could be cut into desired shapes with most inexpensive cutting means.

The present improvement lies in the provision of a method for orienting the ferrites during the mixing of the same with the binder in the production of material prior to its formation into desired final shapes. Critically sized ferrite crystals, such as shown in FIG. 2a, consist of a single magnetic domain with the magnetic field vector perpendicular to the plane of the crystal. The first major step in fabricating a hard oriented ferrite body is to mix these crystals with the raw rubber or similar binder and roll the same into a flat sheet. In my earlier filed application Serial No. 17,540 the ferrite crystals and the raw rubber were simultaneously fed into the area between two rolls of a rubber mill and passed between the rolls and as the mixture was pressed the crystals were mechanically forced to lie parallel to the surface of the roller. As noted above, each of these small crystals is a minute magnet itself. Thus, if the surface of one of the rollers 2 in FIG. 1 is formed, for example, of a soft iron band 4 the individual crystals 6 being fed onto the surface 4 from a supply bin 8 will tend to lie flat on that surface with their magnetic axes perpendicular thereto. These ferrites are, therefore, fed onto the surface 4 of the drum 2 prior to any attempt to mix the same with the raw rubber sheet on roller 16 which sheet has been applied thereto by any well known means.

FIG. 2 shows an enlarged section of the roller 2 with its soft iron peripheral band 4 and a series of ferrite crystals 14 as they lie on the surface after being fed down from the hopper 8. As the roller 2 rotates counterclockwise, as shown by the arrow, these crystals, already oriented by the roller 2, will be brought over and imbedded in the raw rubber on the roller 16 to form a mixture 18 as roller 16 rotates in a clockwise direction about its axis. As the ferrite density increases the thickness of the sheet on the roller will increase and adjusting means are provided to back off roller 2 as shown by the arrow so it will not pull against the surface of sheet 18 to scuff the same. This mixture 18 will rotate with the roller 16 until a sufficient ferrite density has been achieved in the raw rubber rotating on the drum 16. It can then be taken off as a sheet, a portion of which is shown in FIG. 3 at 20. This shows in greatly exaggerated form the location of the ferrite crystals 14 in a slab or sheet of raw rubber to form the raw material from which resultant hard ferrite magnets can be made.

Assuming that the material 20 is of sufficient thickness to make desired parts, the parts can be cut therefrom by using any stamping means, such as a conventional punch or shears for the material is relatively soft and pliable. If the layer is not of sufficient thickness then several layers can be stacked until sufficient thickness is obtained, pressed together and then the resultant form cut from the material. After the part has been cut it is then fired at a given temperature to burn out the bonding material or raw rubber. It is then fired at a higher temperature to sinter the ferrites leaving only the sintered ferrite mass which can lastly be magnetized to form a hard permanent magnet.

What is claimed is:
1. In a method of fabricating ferrite bodies, the steps of preparing ferrite crystals having an inherent permanent magnetization, feeding said ferrite crystals on to the surface of a ferromagnetic drum in substantial quantity to which they align and adhere magnetically, rotating and bringing said drum surface retaining the ferrite crystals into proximity with a second drum having on its surface a sheet of flexible adherent deformable binder material capable of being self-supporting and having a thickness at least several times that of the crystals in which as the surfaces rotate together separated at distance less than the combined thickness of the binder material on said second drum and the crystals on said ferromagnetic drum the crystals from the ferromagnetic drum surface become imbedded to a sufficient density after a plurality of revolutions of the drums forming a mixture of binder material and layers of magnetically oriented ferrite crystals, rolling the resultant mixture out in sheet form from the drum, said crystals remaining in oriented layers therein, cutting said flexible, deformable binder sheet material with the imbedded ferrites into desired final body shape, firing said cut out bodies to burn out the flexible, deformable binder material, and sintering the ferrite crystals to obtain a hard oriented ferrite body.

2. In a method of fabricating ferrite bodies, the steps of preparing ferrite crystals of required size which have inherent permanent magnetization, providing a ferromagnetic surface, spreading said ferrite crystals on said ferromagnetic surface in substantial quantity upon which they align and to which they adhere magnetically, applying a layer of flexible adherent deformable binder material to a second surface, said binder material having a thickness of at least several times that of the crystals and capable of being self-supporting on said second surface, pressing said second surface with said binder material thereon against the ferromagnetic ferrite retaining surface to imbed said crystals in said binder material, removing said layer of flexible binder material with the ferrite crystals imbedded therein, spreading additional ferrite crystals on said ferromagnetic surface, reapplying said layer of binder material to said ferromagnetic ferrite retaining surface and pressing said binder material until the density of the ferrite crystals is sufficiently high whereby layers of magnetically oriented ferrite crystals are completely surrounded therein, stripping off the flexible, adherent deformable binder material from said second surface with the ferrite crystals imbedded therein the form of sheets, cutting from the sheets bodies of desired shape and firing the cut out bodies to burn out the binder, sinter the ferrite crystals and obtain oriented ferrite bodies.

3. In a method of fabricating ferrite bodies, the steps of preparing ferrite crystals of required size which have inherent permanent magnetization, providing a ferromagnetic surface, spreading said ferrite crystals on said ferromagnetic surface in substantial quantity upon which they align and to which they adhere magnetically, applying a layer of flexible adherent deformable binder material to a second surface, said binder material having a thickness of at least several times that of the crystals and capable of being self-supporting on said second surface, pressing said second surface with said binder material thereon against the ferromagnetic ferrite retaining surface to imbed said crystals in said binder material, removing said layer of flexible binder material with the ferrite crystals imbedded therein, spreading additional ferrite crystals on said ferromagnetic surface, reapplying said layer of binder material to said ferromagnetic ferrite retaining surface and pressing said binder material until the density of the ferrite crystals is sufficiently high whereby layers of magnetically oriented ferrite crystals are completely surrounded therein, stripping off the flexible, adherent deformable binder material from said second surface with the ferrite crystals imbedded therein in the form of sheets, stacking a plurality of sheets to obtain the desired thickness of material for final parts, pressing said stack of sheets together to form a unitary body, cutting from the unitary body bodies of desired shape and firing the resultant cut out bodies to burn out the binder, sinter the ferrite crystals and obtain oriented ferrite bodies.

References Cited in the file of this patent

UNITED STATES PATENTS

| | | |
|---|---|---|
| 2,936,814 | Yakubik | May 17, 1960 |
| 2,951,247 | Halpern et al. | Aug. 30, 1960 |
| 2,999,275 | Blume | Sept. 12, 1961 |
| 3,061,919 | Tack | Nov. 6, 1962 |

OTHER REFERENCES

"Ferromagnetic Spinels for Radio Frequencies," by Harvey et al., reprinted from RCA Review, vol. XI, No. 3, September 1950.